United States Patent [19]

Nakamura et al.

[11] Patent Number: 5,016,234
[45] Date of Patent: May 14, 1991

[54] TWO-LASER COLLIMATED BEAM OPTICAL HEAD WITH MONITOR

[75] Inventors: Shigeru Nakamura, Tachikawa; Sadatsugi Machida, Shimabara; Takeshi Nakao, Sagamihara; Masahiro Ojima, Tokyo, all of Japan

[73] Assignee: Hitachi, Ltd., Tokyo, Japan

[21] Appl. No.: 209,982

[22] Filed: Jun. 22, 1988

[30] Foreign Application Priority Data

Jun. 22, 1987 [JP] Japan .................. 62-153478

[51] Int. Cl.$^5$ .................................... G11B 7/00
[52] U.S. Cl. .................................... 369/44.14
[58] Field of Search ............... 372/50; 250/201 DF, 250/205; 369/44–46, 106, 112, 122, 44.11, 44.14, 44.23, 44.37, 44.38

[56] References Cited

U.S. PATENT DOCUMENTS

| | | | |
|---|---|---|---|
| 4,123,780 | 10/1978 | Honjo | 369/121 X |
| 4,283,785 | 8/1981 | Miyauchi et al. | 369/106 X |
| 4,518,408 | 4/1985 | Nomura et al. | 369/46 |
| 4,546,463 | 12/1985 | Opheg et al. | 363/122 X |
| 4,755,980 | 7/1988 | Yoshimura et al. | 369/116 X |
| 4,789,978 | 12/1988 | Shikama et al. | 369/122 X |
| 4,797,868 | 1/1989 | Ando | 369/13 X |
| 4,825,064 | 4/1989 | Ando | 250/205 |
| 4,888,755 | 12/1989 | Itoh | 369/112 X |

FOREIGN PATENT DOCUMENTS

| | | | |
|---|---|---|---|
| 63309 | 10/1982 | European Pat. Off. | 372/50 |
| 60-113335 | 6/1985 | Japan | 369/121 |
| 61-231789 | 10/1986 | Japan | 372/50 |
| 61-280693 | 12/1986 | Japan | 372/50 |

OTHER PUBLICATIONS

"Draw-2-Beam Optical Head by Using Laser Diode Array", Itoh et al., Opt. Memory Symposium, pp. 107–112, 1985.

Primary Examiner—Robert L. Richardson
Attorney, Agent, or Firm—Antonelli, Terry, Stout & Kraus

[57] ABSTRACT

In a two-laser beam optical head including first and second signal detectors for guiding emitting beams from first and second laser sources as two spots to an information medium and detecting the reflected beams from the two spots, the optical head of the present invention has the construction wherein the two laser sources are stored in one package, the emitting beams from two laser sources can be rotated together with a collimate lens with the optical axis of the collimate lens being the center in order to enable the two spots around the optical axis of a focusing lens as the center and the direction of the center line between the two spots can be changed so that the center line between the two spots is always perpendicular to the radial direction of the track on the information medium. The optical head includes further first and second radiating light power optical detectors for detecting the radiating light power of the first and second laser sources, whereby the second signal detector and at least one of the first and second radiating light power optical detector are constituted by one divided optical detector.

13 Claims, 5 Drawing Sheets

TWO-LASER COLLIMATED BEAM OPTICAL HEAD WITH MONITOR

BACKGROUND OF THE INVENTION

1. Field of the Invention

This invention relates to a two-laser beam optical head used for radiating light power detection optical systems and information signal detection optical systems of optical information processing apparatus such as a disk apparatus, optical card apparatus or optical tape apparatus.

2. Description of the Prior Art

In an optical disk apparatus or the like, an error ratio at the time of writing of information is generally higher than in a magnetic disk apparatus. Accordingly, in a one-beam optical head consisting of one light source, it has been customary to check the writing error at the next rotation of the disk after writing and to write once again for the writing error portion. For this reason, it has been necessary to rotate the disk twice before writing is complete. Therefore, Japanese Patent Laid-Open No. 150147/1986, for example, proposes a two-beam laser optical head consisting of two light sources so that the error check can be made immediately after writing. According to this prior art reference, two semiconductor laser beams having different wavelengths are converted to parallel beams by use of two collimate lenses, respectively, and are then synthesized by a beam splitter, and two spots are focused on one track by use of a focusing lens so that the information is written by the preceding laser spot while the information is read by the other laser spot immediately after writing. The reflected beam of the writing laser beam from the disk is guided to a conventional focus error detection optical system and a conventional track error detection optical system through a filter which transmits only the wavelength of the laser described above so as to detect spot position signals such as a focus error signal, a track error detection signal, and an index signal, etc. The reflected beam of the reading laser beam from the disk is guided to a conventional read signal detection optical system through another filter which transmits only the wavelength of the reading laser beam in order to read the information.

Furthermore, since the radiating light power of the semiconductor laser changes with temperature and time, the radiating light power must be detected always and fed back to a driving current. The laser beam is emitted in two directions, that is, forward and rearwards, from a semiconductor laser chip. Therefore, in a package to which only one semiconductor laser chip is mounted, a monitor detector is fitted in advance at the rear part of the chip. Various chips of this type are available commercially on the market. Though it is not mentioned in the prior art reference described above, two semiconductor lasers having different wavelengths have independent packages. Therefore, the semiconductor laser equipped with the monitor detector described above can be employed.

In Japanese Patent Laid-Open No. 929/1986, on the other hand, the writing laser and the reading laser of the two-laser beam optical head are independent and an optical band pass filter is rotated for adjustment so that the writing spot is ahead of the reading spot with a predetermined gap between them. In order to locate both the writing spot and the reading spot on the same track on the disk, a method has been employed which rotates and adjusts a module as an integral unit of the writing laser, a collimate lens and a beam shaping prism.

The first prior art technique described above requires two semiconductor packages each having a monitor detector, two collimate lenses, three beam splitters, two optical band pass filters and at least two optical detectors. Since the number of optical components is great, the optical head is heavy and its cost is high. The second prior art technique requires the adjustment of the writing laser and the reading laser fitted separately from each other and the adjustment of their spot gap, and a large number of optical components necessary as in the first prior art technique. Though this problem can be solved by use of an array laser having two lasers stored in one package, another problem occurs in that since the two laser sources are stored in one package, locating the same track on the disk plane cannot be done by moving only one of the laser sources as in the prior art technique.

To solve this problem, a possible solution would be the rotation of the two-laser beam optical head as a whole so as to locate the two spots on the same track. Here, an example shown in FIG. 14 of the accompanying drawings will be explained. As shown in (a), if two spots 38, 39 are not on the same track on an inner track 34, the two spots 38 and 39 can be put on the track 34 by inclining two optical head feed shafts 32 and rotating the optical head 31 as shown in (b), but if the optical head 31 is moved as such on an outer track 35 as shown in (c), both of the two spots 38, 39 are not on the outer track 35 due to the difference of radius of curvature of the inner and outer tracks of the disk. This is because a deviation 37 exists between a perpendicular line 36 passing the center of a line 43 connecting the two spots 38, 39 and the center 33 of the circle of the tracks.

SUMMARY OF THE INVENTION

It is therefore a primary object of the present invention to obtain a compact, light-weight and economical two-laser beam optical head which includes adjustment means for locating two spots on the same track on a disk plane, employs a simplified structure for a signal detection optical system and has a small number of optical components.

In a two-laser beam optical head including first and second signal detectors for guiding emitting beams from first and second laser sources as two spots to an information medium and detecting the reflected beams from the two spots, the object of the invention described above is accomplished by a two-laser beam optical head characterized first by a member having the two laser sources fixed on a single material and single collimate lens means for converting the two laser beams to parallel beams. Secondly, the optical head of the present invention is characterized by first and second radiating light power optical detectors for detecting the radiating light power of the first and second laser sources wherein the second signal detector and at least one of the first and second radiating light power optical detectors are constituted by one divided optical detector.

The foregoing and other objects, advantages, manner of operation and novel features of the present invention will be understood from the following detailed description when read in connection with the accompanying drawings.

DESCRIPTION OF THE PREFERRED EMBODIMENTS

First of all, the characterizing features of the operation and action of the embodiments of the present invention will be explained broadly.

In order to focus each beam leaving a light source on a disk surface in the focusing means in an optical head of the present invention such as a focusing lens, when two laser sources are rotated with the optical axis of the focusing lens being the center, two spots focused on the disk surface are rotated. Therefore, when an optical system including the two laser sources is rotated around the optical axis of the focusing lens as the center, location of two spots on the same track can be made. In accordance with the present invention, since the rotation of the two spots can be regulated without rotating the optical head, the off-track 37 explained already with reference to FIG. 14(c) does not occur and if the adjustment is made at an arbitrary track position, the off-track does not occur between the two spots 38 and 39 even when the optical head is moved to all the track positions from the track position on the inner track to the track position on the outer track.

Two parallel beams can be obtained by one collimate lens by mounting two semiconductor laser chips to one laser package. However, since the emitting beams from the back of the two semiconductor laser chips overlap with each other, it is difficult to dispose two optical detectors for monitoring the radiating light power, respectively. If parts of the parallel beams outgoing from the two semiconductor chips are reflected by (or transmitted through) a beam splitter and condensed by a convex lens respectively, two spots can be separated and two radiating light power detection signals can be obtained by detecting the two spot light by the optical detectors, respectively.

On the other hand, the two laser beams transmitting through (or reflected by) the beam splitter focus two spots on the track of the disk by the focusing lens and the preceding spot relative to the rotation of the disk is used for writing with the trailing spot being used for reading. The reflected beams from the disk by these laser spots are reflected by (or transmitted through) the beam splitter so that one of the laser beams is transmitted by optical splitting means while the other laser beam is reflected on the side of the beam splitter. The laser beam transmitting through the optical splitting means is introduced into a conventional focus error detection optical system or a track error detection optical system so as to obtain spot position control signals such as a focus error detection signal or a track error detection signal and further an information read signal.

The laser beam that is reflected by the optical splitting means transmits through (or is reflected by) the beam splitter and is then introduced in the direction where the radiating light power optical detector is disposed and is condensed as the spot. The position of this spot can be set to a position different from the positions of the spots for detecting the radiating light powers by adjusting the reflecting direction by the optical splitting means. Therefore, if three spots are detected by a triple optical detector, two radiating light power detection signals and one information read signal can be obtained from an optical detector of one package. The laser beam reflected by the optical splitting means may be either a laser beam for writing or a laser beam for reading.

Figure 1:
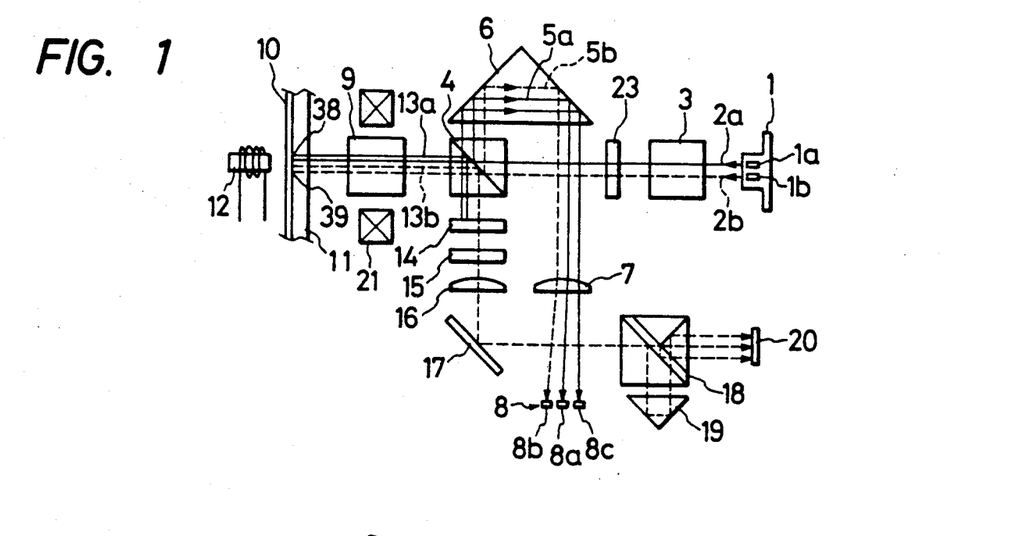
FIG. 1 is an explanatory view showing the first embodiment of a two-laser beam optical head in accordance with the present invention.
Figure 2:
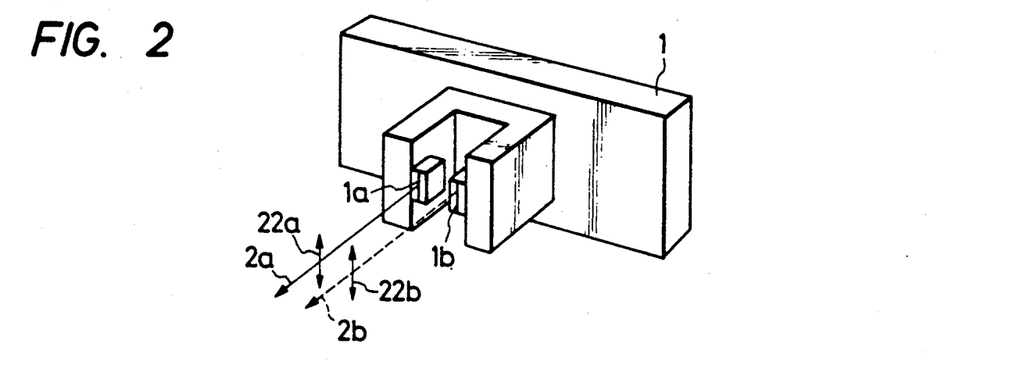
FIG. 2 is an enlarged perspective view of two-wavelength semiconductor lasers in the embodiment described above.

The first embodiment of the present invention shown in FIG. 1 represents the application of the present invention to an optical head of a magneto-optic disk apparatus. A semiconductor laser chip 1a having a wavelength of 830 nm, for example, and a semiconductor chip for reading 1b having a wavelength of 780 nm, for example, are mounted to one semiconductor laser package 1 as shown in FIG. 2. Two laser beams 2a and 2b outgoing from these laser chips 1a and 1b are polarized in the directions 22a and 22b represented by arrows in FIG. 2, respectively, are turned into parallel beams by a collimate lens 3 and are then incident into a beam splitter 4. A multi-layered dielectric film which reflects 30% of p polarized light and 100% of s polarized light of the laser beam having a wavelength of 780 nm, for example, is vacuum deposited to the beam splitter 4. Therefore, after passing a ½ wavelength plate 23, the polarizing directions of the laser beams 2a and 2b are inside the sheet of drawing in FIG. 1 and become the p polarized lights with respect to the multi-layered dielectric film. Accordingly, 30% of the laser beam 2a is reflected while 10% of the laser beam 2b is reflected, for example. These reflected beams 5a and 5b are reflected twice by a rectangular triangle prism 6, and are then condensed by a convex lens 7 on divided optical detecting devices 8a and 8b of an optical detector 8, thereby providing the radiating light power detection signals of the laser chips 1a and 1b, respectively.

Figure 3A:
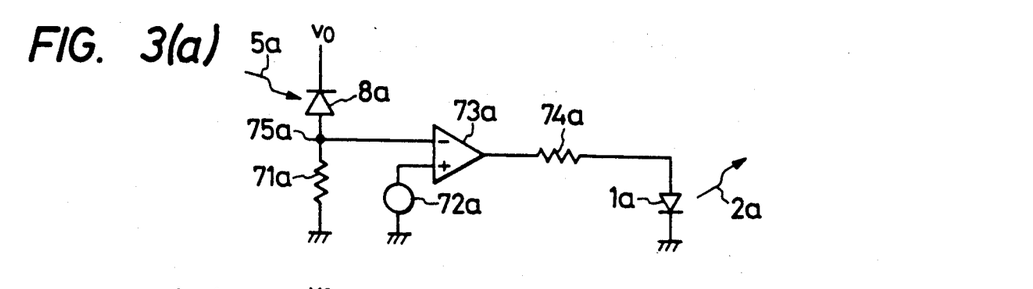
FIGS. 3(a) and 3(b), are explanatory views, each useful for explaining the optical detection in the embodiment described above.
Figure 3B:
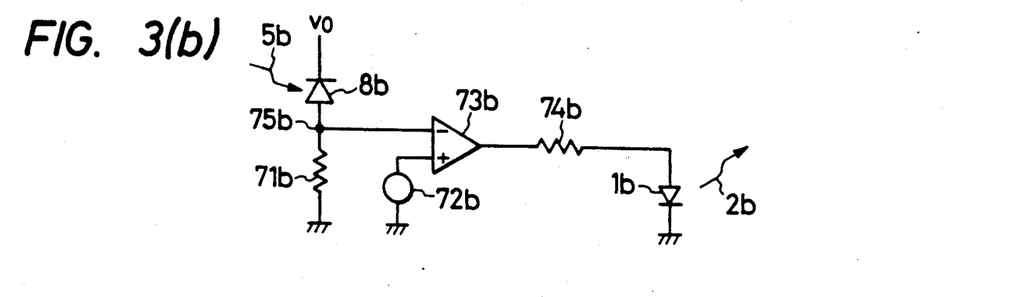

As shown in FIGS. 3(a) and 3(b), a backward voltage $v_o$ is applied to the divided optical detecting device 8a or 8b, which passes a current proportional to the optical quantity of the laser beam 5a or 5b. This current is converted to a voltage at the junction 75a or 75b between 8a and a resistor 71a or between 8b and a resistor 71b. A voltage for setting the radiating light power 72a or 72b and the voltage at the junction 75a or 75 are compared by a differential amplifier 73a or 73b and a current is passed through the laser chip 1a or 1b through a load resistor 74a or 74b so as to keep constant the optical quantity of the laser beam 2a or 2b.

After passing through the beam splitter 4 described above, the laser beams 2a and 2b focus two spots 38 and 39 on a magneto-optic film 10 of a magneto-optic disk 11 by a focusing lens 9. An electromagnet 12 is disposed in order to record a magneto-optic signal on the magneto-optic film 10. It heats the magneto-optic film at the writing spot and inverses the impressed magnetic field by the electromagnet 12 for writing. The reflected beams 13a (wavelength: 830 nm) and 13b (wavelength: 780 nm) from the disk 11 are again turned to the parallel beams by the focusing lens 9 and 10% of the reflected beam 13a and 30% of the reflected beam 13b, for example, are reflected by the beam splitter 4. A multi-layered dielectric film is vacuum deposited to the surface of an optical band pass filter 14 and reflects almost 100% of the laser beam of 830 nm but transmits about 90% of the laser beam of 780 nm. Therefore, the reflected beam 13a is reflected by the optical band pass filter 14, passes through the beam splitter 4 and then through the rectangular triangle prism 6 and is focused by the convex lens 7 on the plane of the divided optical detecting device 8c of the optical detector 8. Therefore, address information of the laser spot for writing, clocks for writing, unwritten/written marker and other information necessary for writing can be reproduced by the output signal of the divided optical detecting device 8c.

Figure 4:
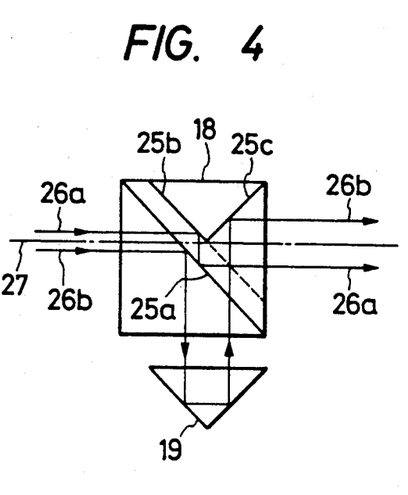
FIG. 4 is an explanatory view of a detection prism.

On the other hand, the reflected beam 13b passes through the optical band pass filter 14 and then through the ½ reflection plate 15 as well as the convex lens 16 and after reflected by a mirror 17, are divided into three beams by a detecting prism 18 and a sub-prism 19 and detected by an optical detector 20. The polarizing direction of the reflected beam 13b after passing through the optical band pass filter 14 is substantially inside the sheet of drawing of FIG. 1 but is rotated by several degrees by the magnetization direction of the magneto-optic film 10. The polarizing direction of the reflected beam 13b is rotated by 45° by the ¼ wavelength plate 15. As shown in FIG. 4, the detection prism 18 is produced by bonding prisms each produced by vacuum depositing polarized beam splitting layers 25a, 25b and 25c. Therefore, among the s polarized light component of the reflected beam 13b whose polarizing direction is rotated by 45° by the ¼ wavelength plate 15, the laser beam 26a of the upper half of the center optical axis 27 is reflected by the polarized beam splitting layers 25b and 25a and becomes a semicircular shape beam represented by 26a in FIG. 5 on the plane of the optical detector 20. The s polarized light component laser beam 26b of the lower half of the center optical axis 27 is reflected by the polarized beam splitting layer 25a, the sub-prism 19 and the polarized beam splitting layer 25c and becomes a semicircular shape beam represented by 26b in FIG. 5.

Figure 5:
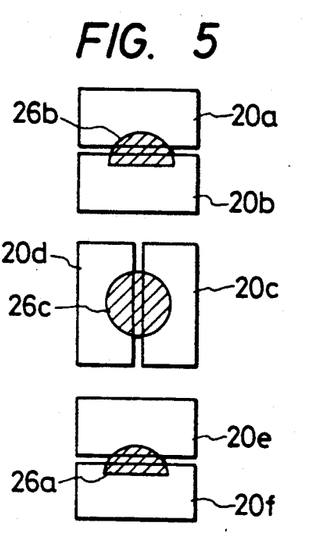
FIG. 5 shows a divided optical detecting device in an optical detector.

On the other hand, the p polarized component of the reflected beam 13b passes as such through the detection prism so that it becomes a circular shape beam represented by 26c in FIG. 5. The optical detector 20 is disposed at almost the center of the two focusing points of the laser beams 26a and 26b of the s polarized component by the convex lens 16 and has six divided optical detecting devices 20a, 20b, 20c, 20d, 20e and 20f shown in FIG. 5. When the disk 11 is at the position of focus of the focusing lens 9, the size of the semicircular shape beam 26a is equal to that of 26b but when the disk 11 approaches to the focusing lens 26a, the semicircular shape beam 26a becomes greater and the semicircular shape beam 26b becomes smaller and when the disk moves away from the focusing lens 9, on the contrary, the semicircular shape beam 26a becomes smaller and the semicircular shape beam 26b becomes greater. Therefore, the focus error detection signal can be obtained as $(Sa-Sb)+(Sf-Se)$ with Sa, Sb, Sc, Sd, Se and Sf representing the outputs of the optical detecting devices 20a, 20b, 20c, 20d, 20e and 20f, respectively. Since the track of the disk 11 is inside the sheet of drawing of FIG. 1, the track error detection signal can be obtained as $Sc-Sd$ on the basis of the principle of a conventional track error detection method of diffraction push-pull type. On the other hand, $Sa+Sb+Se+Sf$ is the s polarized light component of the reflected beam 13b and $Sc+Sd$ is the p polarized light component. Therefore, on the basis of detection of the push-pull type magneto-optic signal, the magneto-optic signal can be read out as $(Sa+Sb+Se+Sf)-(Sc+Sd)$.

Figure 15:
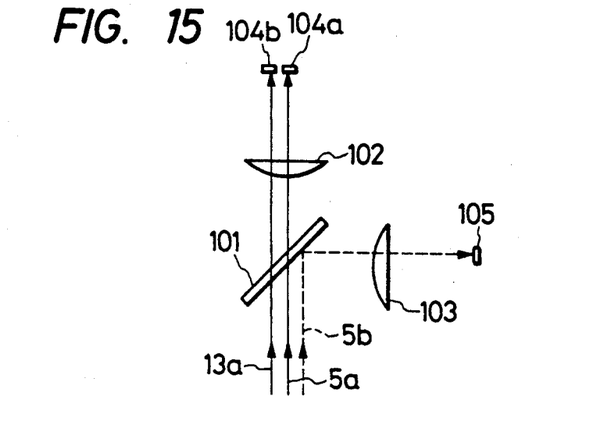
FIG. 15 shows another example of detection in the first embodiment.

FIG. 15 shows another embodiment for detecting the three beams 5a, 5b and 13a in the first embodiment shown in FIG. 1. The beam 5b of the wavelength 780 nm is reflected by a second optical band pass filter 101, is condensed by a lens 103 and detected by an optical detector 105 to keep constant the radiating light power of the laser chip 1b shown in FIG. 3. On the other hand, the beam 5a of the wavelength 830 nm passing through the optical band pass filter 101 is condensed by a lens 102, detected by the optical detector 104a and used by the circuit shown in FIG. 3 in order to keep constant the radiating light power of the laser chip 1a. The beam 13a of the wavelength 830 nm passing through the optical band pass filter 101 is detected by the optical detector 104b and used for reading the afore-mentioned address information of the laser spot for writing, and the like. An integral type divided optical detector can be used as the optical detectors 104a and 104b.

Figure 6:
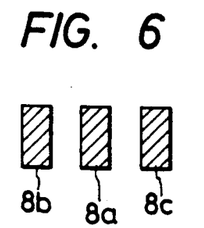
FIG. 6 shows a detecting plane of the divided optical detecting device described above.

The detecting plane of each divided optical detecting devices in the optical detector 8 has a structure such as represented by oblique lines in FIG. 6, for example. When the distance between the laser chips 1a and 1b is 100 μm, the focal length of the collimate lens 3 is 8.75 mm and that of the convex lens 7 is 12 mm, the spot gap between the reflected beams 5a and 5b on the plane of the optical detector 8 is $100\times(12/8.75)\approx 137$ μm so that the position adjustment in the 10 μm order becomes necessary for the optical detecting devices 8a and 8b. Therefore, the optical detecting device 8a in FIG. 6, for example, is quadrupled further such as 8a' and the position adjustment is made so that the outputs of the optical detecting devices at the diagonal positions become equal to one another. It is thus possible to radiate the reflected beams 5a and 5b to the centers of the optical detecting devices 8a' and 8b', respectively.

Figure 7:
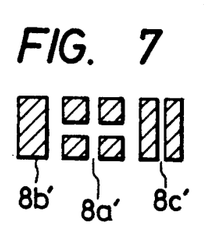
FIG. 7 shows a detecting plane formed by dividing further the detecting plane described above.
Figure 8:
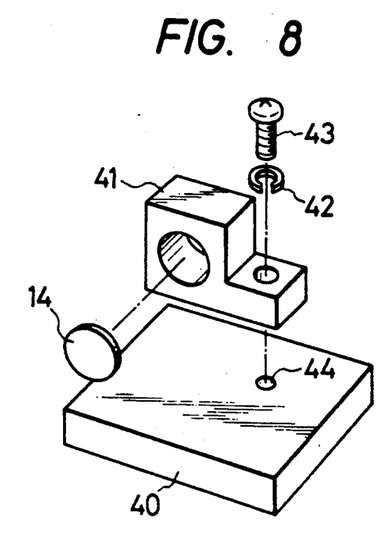
FIG. 8 is a perspective view showing fitting of an optical band pass filter.

It is also possible to let the optical detecting device 8c of the optical detector 8 detect the reflected beam 13a by fixing the optical band pass filter 14 to a holder 41, then fixing this holder 41 to a screw hole 44 of an optical head casing 40 by use of a screw 43 through a spring washer 42 and adjusting the angle of the holder 41, as shown in FIG. 8. In this case, too, if the optical detecting device 8c is further divided into two segments such as the optical detecting device 8c' shown in FIG. 7, the reflected beam 13a can be radiated to the center of the optical detecting device 8c'.

In a two-laser beam optical head having different wavelengths, this embodiment can provide a signal detection optical system capable of adjusting accurately the position of a divided optical detector for detecting radiating light power and for detecting a read signal by a write spot which has a reduced number of optical components.

Figure 9:
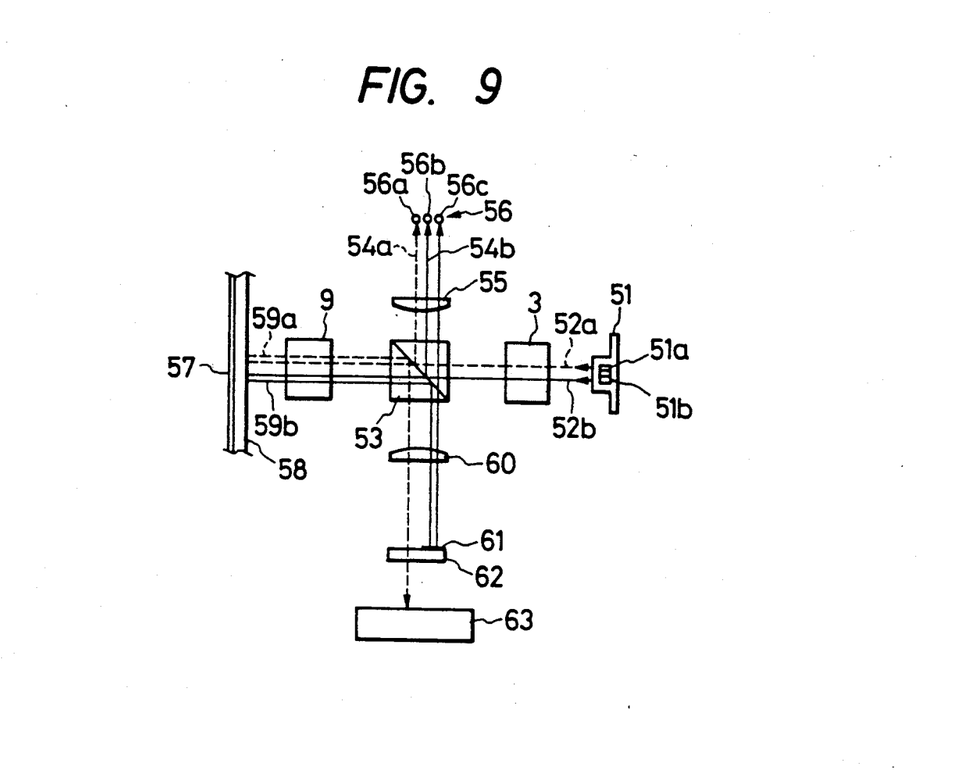
FIG. 9 shows the second embodiment of the present invention.

FIG. 9 shows the second embodiment of the invention used for a write-once type optical disk apparatus. In FIG. 9, a monolithic laser having laser chips 51a and 51b which are formed on the same semiconductor substrate and have the same wavelength is mounted to a semiconductor laser package 51. A laser beam 52a is for writing while a laser beam 52b is for reading. After passing through a collimate lens 3, 50% of the optical quantity of these laser beams is reflected by a half prism 53 and the reflected beams 54a and 54b are detected by divided optical detecting devices 56a and 56b of an optical detector 56 through a convex lens 55. The radiating light power signals of the laser chips 51a and 51b outputted from the divided optical detecting devices 56a and 56b are used in order to keep constant the radiating light power of the laser chips 51a and 51b with respect to the temperature variations and changes with time by a circuit system shown in FIG. 3, for example.

Figures 10, 11:
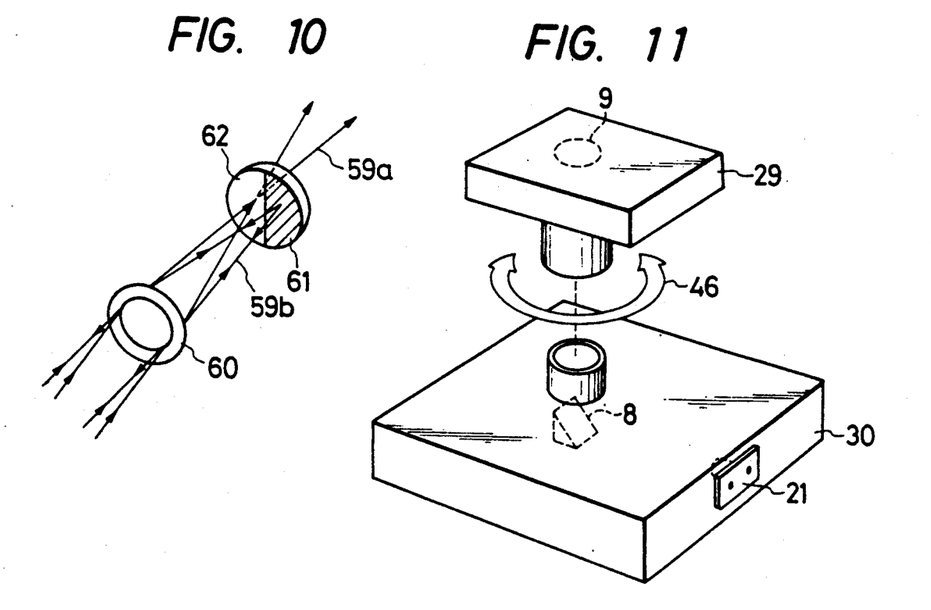
FIG. 10 is an explanatory view of a partially reflecting mirror in the second embodiment.
FIG. 11 is an explanatory view showing the third embodiment of the present invention.

The transmitting beams 52a and 52b of the half prism 53 focus the writing spot and reading spot on a recording film of the optical disk 58 by a focusing lens 9. The reflected beams 59a and 59b are reflected by the half prism 53 and focused on the surface of a partially reflecting mirror 62 by a convex lens 60 as shown in FIG. 10. Since a metal film 61 is vacuum deposited to only the half of the partially reflecting mirror 62 as represented by oblique lines in FIG. 10, the reflected beam 59b is reflected whereas the reflected beam 59a transmits. The reflected beam 59b passes again through the convex lens 60 and the half prism 53 and condensed on the optical detecting device 56c of the optical detector 56 by the convex lens 55. Therefore, it is possible to obtain two radiating light power detection signals and the read signal of the reading spot from the optical detector 56.

On the other hand, the laser beam 59a transmitting through the partially reflecting mirror 62 is guided to a spot position control detection system and a read signal detection optical system 63 in accordance with the prior art technique so as to obtain a focus error detection signal, a track error detection signal and a read signal by the writing spot. Furthermore, it is possible to use the optical detector shown in FIG. 7 or to use an adjustment mechanism shown in FIG. 8 as the angle adjustment mechanism of the partially reflecting mirror. In this manner, precise locating of the optical detector can be made.

This embodiment can be applied as such to the optical head of a phase-change optical disk besides the optical head of the write-once optical disk, and further to a two-layer beam optical head having different wavelengths.

Next, the third embodiment of the present invention will be described with reference to FIGS. 1 and 11. It will be assumed that in FIG. 1, the focusing lens 9 and drive means 21 are stored in a chassis 29 shown in FIG. 11 and all the components other than the disk 11 are fitted into a chassis 30. When the two spots 38, 39 focused on the magneto-optic film 10 of the disk 11 by the two laser beams 2a and 2b are not on the same track, they can be located onto the same track at an arbitrary position by fixing the chassis 29 and rotating the chassis 30 as represented by arrow 46 because these chassises 38, 39 are of a fit type.

Figure 12:
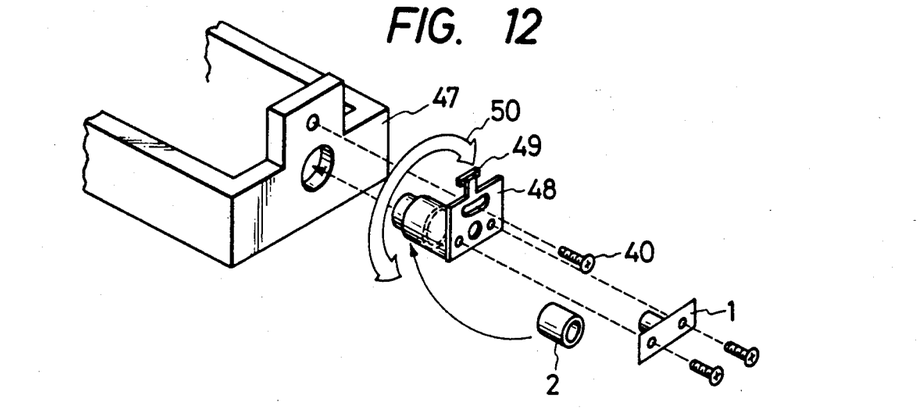
FIG. 12 is an explanatory view showing the fourth embodiment of the present invention.

Next, the fourth embodiment of the present invention will be described with reference to FIGS. 1 and 12. The construction of the optical system is the same as that of the first embodiment. The components shown in FIG. 1 other than the disk 11, the package 1, the laser source 1a, 1b and the collimate lens 3 are stored in a chassis 47. Therefore, the laser beams 2a and 2b outgoing from the laser sources 1a, 1b are guided into the optical detector 8 through the same paths as in the first embodiment shown in FIG. 1. If the spots 38 and 39 are not on the same track, a handle 49 of a holder 48 to which the package 1 storing therein the collimate lens 3 and the laser sources 1a, 1b is rotated as represented by arrow 50 in FIG. 12 so that the spots 38 and 39 can be located on the same track at an arbitrary position.

Figure 13:
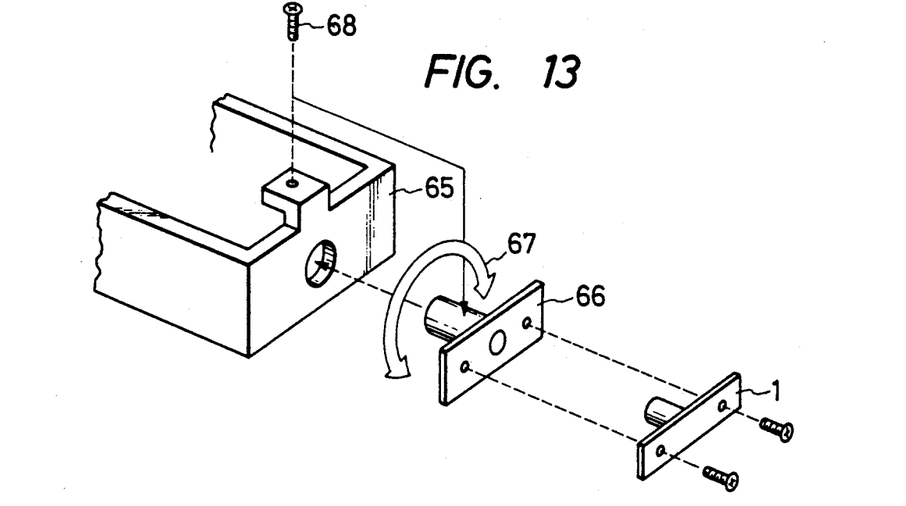
FIG. 13 is an explanatory view showing the fifth embodiment of the present invention.
Figure 14A:
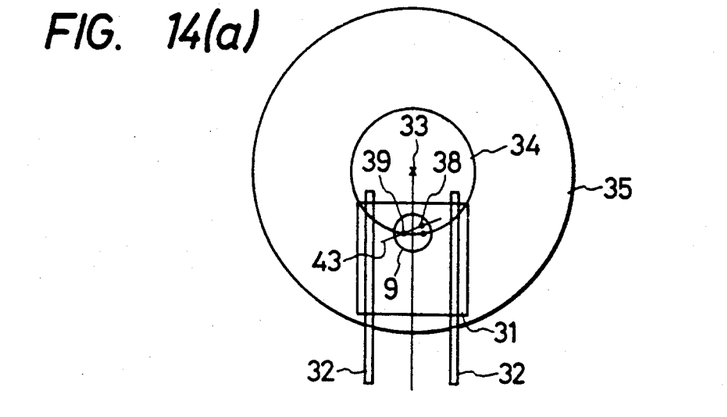
FIG. 14 is an explanatory view useful for explaining the adjustment of spots relative to a track, wherein (a) shows the case where the spots are not on an inner track, (b) shows the case where the two spots are on the inner track and (c) shows the case where the spots are away from the track on an outer track, respectively.
Figure 14B:
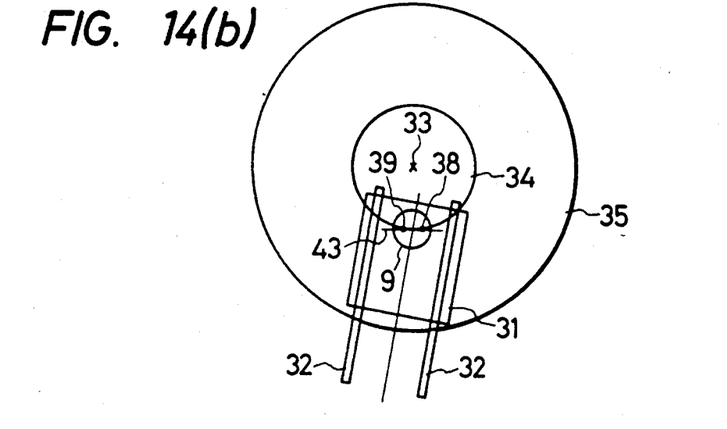
Figure 14C:
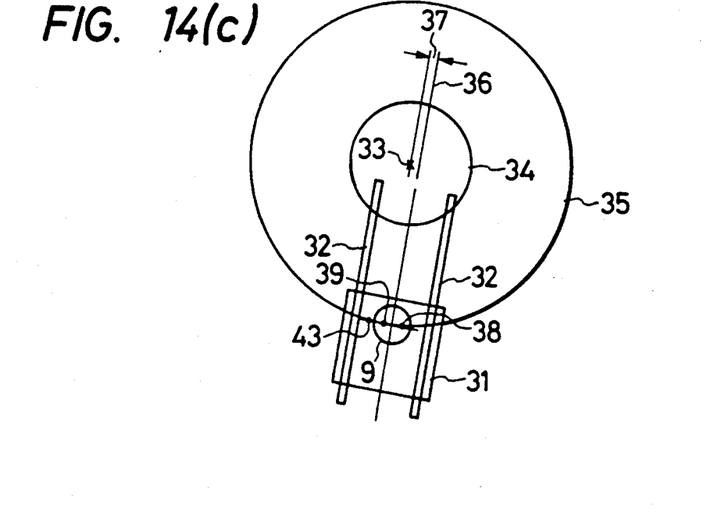

The fifth embodiment of the present invention shown in FIG. 13 will be described with reference to FIG. 1, too. The construction of the optical system is the same as that of the first embodiment, and the components other than the disk 11, the package 1, and the laser sources 1a, 1b are fitted into a chassis 65. The laser beams 2a and 2b outgoing from the laser sources 1a, 1b are guided to the optical detector 8 through the same path as that of the first embodiment shown in FIG. 1. When the spots 38 and 39 are not on the same track of the disk 11, a holder 66 to which the package 1 storing the laser sources 1a, 1b is fitted is rotated as represented by arrow 67 in FIG. 13 and is then fixed by a screw 68 so that the spots 38 and 39 can be positioned on the same track at an arbitrary position.

In a two-laser beam optical head which guides the emitting beams of first and second semiconductor laser sources as two spots to an information medium and which includes first and second signal detectors for detecting the reflected beams from the two spots described above, the two-laser beam optical head in accordance with the present invention stores the two semiconductor laser sources in one package and is equipped with the first and second radiating light power optical detectors described above; with a beam splitter for separating the reflected beams from the information medium; and with optical splitting means disposed between the beam splitter and the first signal detector in order to transmit the first semiconductor laser beam but to reflect the second semiconductor laser beam; wherein the second signal detector and at least one of the first and second signal detectors are constituted by one divided optical detector. Accordingly, the two-laser beam optical head can be constituted by use of one each of laser package, collimate lens, beam splitter, optical splitting means, divided optical detector for detecting radiating light quantity and divided optical detector for detecting a read signal, although two each of them have been necessary conventionally in the signal detection optical system of the two-laser beam optical head. Furthermore, the adjustment of the spot gap becomes unnecessary by disposing adjustment means capable of rotating around the optical axis of the focusing lens in the optical system including an array laser so that the spot gap does not deviate so easily, two spots can be positioned on the same track and off-track can be prevented. It is therefore possible to obtain a compact, light-weight and economical two-laser beam optical head which can prevent the spot gap deviation and off-track and which has a simplified optical system.

What is claimed is:

1. A two-laser beam optical head apparatus, comprising:
   a first laser source and a second laser for radiating respective laser beams;
   a single collimate lens means for collimating the two laser beams radiated from said laser sources to produce collimated parallel beams, said first and second laser sources being fixed on a single material fixed to said single collimate lens means;
   beam splitter means, located between said laser sources and an information medium, for splitting off a first and a second monitor beam from the collimated beams prior to irradiation of the information medium by the collimated beams and for splitting off a first and a second reflected beam from the collimated beams after the collimated beams have irradiated the information medium and have been reflected from the information medium, the reflected beams having a direction of travel from the beam splitter means which is opposite the direction of travel of the monitor beams from the beam splitter means;
   optical splitting means for transmitting the second reflected beam through the optical splitting means and for reflecting the first reflected beam so that the first reflected beam has the same direction of travel as the first and second monitor beams;
   a first optical detector having a first and a second optical detecting device for detecting radiating light power of said first and second laser sources and having a third optical detecting device for receiving the first reflected beam; and
   a second optical detector for receiving the second reflected beam.

2. A two-laser beam optical head apparatus according to claim 1, wherein said laser sources fixed on the single material fixed to said single collimate lens means form an integrated member.

3. A two-laser beam optical head apparatus according to claim 1, wherein said optical splitting means is an optical band pass filter.

4. A two-laser beam optical head apparatus according to claim 1, wherein said optical splitting means is a spatial splitting optical system consisting of a convex lens and a partially reflecting mirror.

5. A two-laser beam optical head apparatus according to claim 1, further comprising an optical band pass filter disposed between the beam splitter means and said first optical detector.

6. A two-laser beam optical head apparatus according to claim 5, further comprising a detecting prism and a sub-prism, disposed in a path of the second reflected beam between the optical splitting means and said second optical detector, for dividing the second reflected beam into three separate beams.

7. A two-laser beam optical head apparatus according to claim 6, wherein said second optical detector has three light detecting portions which receive the three separate beams, respectively, each of said three light detecting portions being a twice-divided detecting device.

8. A two-laser beam optical head apparatus according to claim 1, wherein said first optical detector comprises one integral type divided detector including at least said first optical detecting device and a third optical detecting device.

9. A two-laser beam optical head apparatus according to claim 1, wherein one of said first and second optical detecting devices is divided into at least four positioning detectors for positioning control.

10. A two-laser beam optical head apparatus according to claim 1, further comprising means for rotating the beams radiated from said laser sources around an optical axis of said single collimate lens means, together with said single collimate lens means.

11. A two-laser beam optical head apparatus according to claim 10, wherein the beams radiated from said laser sources are emitting beams from an integral structure of one package storing therein said laser sources and said single collimate lens means.

12. A two-laser beam optical head apparatus according to claim 1, wherein said first and second optical detecting devices and said third optical detecting device are fixed in one member.

13. A two-laser beam optical head apparatus, comprising:
   a first laser source and a second laser source for radiating respective laser beams;
   a single collimate lens means for collimating the two laser beams radiated from said laser sources to produce collimated parallel beams;
   beam splitter means, located between said laser sources and an information medium, for splitting off a first and a second monitor beam from the collimated beams prior to irradiation of the information medium by the collimated beams and for splitting off a first and a second reflected beam from the collimated beams after the collimated beams have irradiated the information medium and have been reflected from the information medium, the reflected beams having a direction of travel from the beam splitter means which is opposite the direction of ravel of the monitor beams from the beam splitter means;
   optical splitting means for transmitting the second reflected beam through the optical splitting means and for reflecting the first reflected beam so that the first reflected beam has the same direction of travel as the first and second monitor beams;
   a first optical detector having a first and a second optical detecting device for detecting radiating light power of said first and second laser sources and having a third optical detecting device for receiving the first reflected beam;
   a second optical detector for receiving the second reflected beam; and
   means for rotating the beams radiated from said laser sources, together with said single collimate lens means, around an optical axis of said single collimate lens means;
   wherein said first and second laser sources and said single collimate lens means form an integrated member.

* * * * *